(12) United States Patent
Seo et al.

(10) Patent No.: US 9,257,879 B2
(45) Date of Patent: Feb. 9, 2016

(54) MOTOR FOR ENVIRONMENT-FRIENDLY VEHICLE

(71) Applicant: Hyundai Motor Company, Seoul (KR)

(72) Inventors: Young Jin Seo, Gyeonggi-do (KR); Dong Yeon Han, Seoul (KR); Myeong Kyu Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 538 days.

(21) Appl. No.: 13/727,920

(22) Filed: Dec. 27, 2012

(65) Prior Publication Data

US 2014/0097719 A1    Apr. 10, 2014

(30) Foreign Application Priority Data

Oct. 8, 2012 (KR) .......................... 10-2012-0111550

(51) Int. Cl.
| | |
|---|---|
| *H02K 1/04* | (2006.01) |
| *H02K 3/46* | (2006.01) |
| *H02K 21/02* | (2006.01) |
| *H02K 21/14* | (2006.01) |

(Continued)

(52) U.S. Cl.
CPC .. *H02K 3/46* (2013.01); *H02K 1/12* (2013.01); *H02K 16/04* (2013.01); *H02K 21/024* (2013.01); *H02K 21/14* (2013.01); *H02K 1/02* (2013.01); *H02K 1/04* (2013.01); *H02K 7/12* (2013.01); *H02K 2213/09* (2013.01)

(58) Field of Classification Search
CPC ............. H02K 1/02; H02K 1/04; H02K 7/12; H02K 16/04; H02K 21/022; H02K 21/023; H02K 21/024; H02K 21/028

USPC .................... 310/216.015–216.019
See application file for complete search history.

(56) References Cited

U.S. PATENT DOCUMENTS

| | | | |
|---|---|---|---|
| 5,763,977 A | * | 6/1998 | Shimasaki et al. ............ 310/191 |
| 6,844,647 B2 | * | 1/2005 | Horber ..................... 310/156.43 |

(Continued)

FOREIGN PATENT DOCUMENTS

| | | | | |
|---|---|---|---|---|
| JP | H05-300712 A | | 11/1993 | |
| JP | 11012756 A | * | 1/1999 | .............. C23C 22/00 |

(Continued)

OTHER PUBLICATIONS

Yamaguchi et al., Machine Translation of JP11012756A, Jan. 1999.*

(Continued)

*Primary Examiner* — Quyen Leung
*Assistant Examiner* — Eric Johnson
(74) *Attorney, Agent, or Firm* — Mintz Levin Cohn Ferris Glovsky and Popeo, P.C.; Peter F. Corless

(57) ABSTRACT

Discloses is a motor for an environmentally friendly vehicle. In particular, the motor includes a stator core including a first coating portion and a second coating portion. The first portion and the second coating portion are adjacent to each other, wound with a coil on an outside thereof and fixedly installed in a motor case and the first coating portion is thinner than the second coating portion. The motor also includes a rotor core configured to move between the first coating portion and the second coating portion depending upon a speed of the motor. A controller is configured to control an operation of an actuator to move the rotor between the first coating portion and the second coating portion to maximize the efficiency of the motor depending upon the speed of the motor.

9 Claims, 5 Drawing Sheets

(51) Int. Cl.
  *H02K 1/12* (2006.01)
  *H02K 16/04* (2006.01)
  *H02K 1/02* (2006.01)
  *H02K 7/12* (2006.01)

(56) References Cited

U.S. PATENT DOCUMENTS

| | | | |
|---|---|---|---|
| 2002/0117926 A1* | 8/2002 | Joong et al. | 310/191 |
| 2004/0041485 A1* | 3/2004 | Horber | 310/156.43 |
| 2008/0284256 A1* | 11/2008 | Budde et al. | 310/12 |
| 2009/0230800 A1* | 9/2009 | Jafoui et al. | 310/156.12 |
| 2010/0255188 A1* | 10/2010 | Maeda et al. | 427/127 |

FOREIGN PATENT DOCUMENTS

| | | |
|---|---|---|
| JP | 2002-247822 A | 8/2002 |
| JP | 2006-230054 A | 8/2006 |
| JP | 2008-148516 A | 6/2008 |
| JP | 2008-245440 A | 10/2008 |
| JP | 2010206952 A * | 9/2010 |
| KR | 10-2002-0049285 A | 6/2002 |

OTHER PUBLICATIONS

Takizawa, Machine Translation of JP2010206952A, Sep. 2010.*

* cited by examiner

MOTOR FOR ENVIRONMENT-FRIENDLY VEHICLE

CROSS-REFERENCE TO RELATED APPLICATION

This application claims under 35 U.S.C. §119(a) the benefit of Korean Patent Application No. 10-2012-0111550 filed on Oct. 8, 2012 the entire contents of which are incorporated herein by reference.

BACKGROUND (a) Technical Field

The present invention relates to a motor for an environment-friendly vehicle, and more particularly, to a technology associated with a motor for an environment-friendly vehicle that maximizes efficiency regardless of which driving state the vehicle is currently in (i.e., whether the vehicle is traveling at low speeds, medium speeds or high speeds).

(b) Background Art

Generally, a motor is mounted on environment-friendly vehicle (including an electric vehicle, a hybrid electric vehicle, a fuel battery vehicle, and the like) as a power source for providing a drive source to a vehicle. More specifically, an AC electric motor (AC motor) is used to provide this drive force. An AC motor typically includes a stator core 1 wound with a coil that is fixedly installed as illustrated in FIG. 1 and a rotor core 2 is installed in the stator core 1, and a shaft 3 extracting power that is integrally coupled to the rotor core 2. The stator core 1 is often formed by laminating a plurality of thin electrical steel sheets 1a in order to reduce hysteresis loss (iron loss), and insulation coating 1b is applied between the electrical steel sheets 1a for interlayer insulation of the electrical steel sheets 1a.

In most vehicles, the efficiency of the motor should be maximized at low and medium speeds during which time the frequency use of the motor is quite high. However, it is difficult to increase the motor's efficiency at both low and medium speeds due to the characteristics the currently offered motors.

In conventional motors, a method for increasing efficiency by minimizing the hysteresis loss (iron loss) is often adopted. Advantageously, the thickness of the electrical steel sheet 1a is smaller while the thickness of the insulation coating 1b is larger than conventional designs in order to minimize the hysteresis loss (iron loss) to provide high efficiency at medium and high speeds.

However, when the thickness of the insulation coating 1b is increased, the thickness of the electrical steel sheet 1a which is a pure core serving a movement passage of a magnetic flux is relatively decreased and as a result, output from the motor is decreased (i.e., efficiency is low) at low speeds. As a result, a current value must be increased in order to guarantee the same output at low speeds as medium and high speeds. Unfortunately, however, when the current value is increased, power loss (copper loss) occurs. In other words, in conventional motors, the hysteresis loss (iron loss) is minimized by increasing the thickness of the insulation coating 1b and thus efficiency is increased, and this structure shows high efficiency at medium/high speeds while has having a low efficiency at low speeds.

The thickness of the insulation coating 1b may be decreased in order to increase efficiency at low speeds, but in this case, as the hysteresis loss (iron loss) is increased, the efficiency of the motor overall decreases which is also not ideal. Furthermore, the current value may be increased in order to acquire the same output during low speeds as medium and high speeds, but power loss (copper loss) occurs as a result of this solution. Accordingly, in conventional motors, it is difficult to increase the efficiency at both low speeds and medium/high speeds. Thus, a motor that is able to bridge the gap between the two speed states is needed.

The description provided above as a related art of the present invention is just for helping understanding the background of the present invention and should not be construed as being included in the related art known by those skilled in the art.

SUMMARY OF THE DISCLOSURE

The present invention has been made in an effort to solve the above-described problems. An object of the present invention is to provide a motor for an environment-friendly vehicle that provides high efficiency while minimizing copper loss at low speeds and provide high efficiency by minimizing iron loss at medium and high speeds.

An exemplary embodiment of the present invention provides a motor for an environment-friendly vehicle including: a stator core including a first coating portion and a second coating portion each having a different thickness of insulation coating, respectively, that are adjacent to each other and wound with a coil on the outside thereof and fixedly installed within a motor case; a rotor core movably installed in a lengthwise direction of the stator core to be positioned within the first coating portion or positioned within the second coating portion as well as be rotatable within the stator core; a shaft integrally coupled with the rotor core while penetrating the rotor core; an actuator connected with an end portion of the shaft to provide a movable force to the shaft; and a controller configured to control an operation of the actuator.

In the exemplary embodiment of the present invention, the second coating portion may be thicker than the first coating portion. The first coating portion may include a plurality of laminated electrical steel sheets, and a thin-film insulation coating having a thickness in the range of about 0.5 to 1.0 μm, which is coated on the electrical steel sheets for interlayer insulation between the electrical steel sheets. The second coating portion may include a plurality of laminated electrical steel sheets, and a thin-film insulation coating having a thickness in the range of about 1.0 to 3.0 μm, which is coated on the electrical steel sheets to provide interlayer insulation between the electrical steel sheets.

The actuator may be a core mounted with a coil on the outer surface thereof to generate an electromagnetic force when current is applied thereto, and the shaft may be formed via a permanent magnet and configured to move in opposite directions to each other according to the direction of current applied to the coil. Furthermore, the shaft may be made of steel that moves when current is applied to the coil. When the shaft is made of steel, the actuator further may further include a return spring that provides an elastic force in order to return the shaft to its original position, and one end of the return spring may be coupled to the shaft and the other end of the return spring may be coupled to the motor case.

The actuator may also include a cylinder having a first port and a second port at both ends thereof, and a piston that linearly moves within the cylinder according to an oil pressure supplied to the cylinder. In addition the shaft may be connected with the piston.

The actuator may also be the core which is axially rotated by power from the motor and coupled to the shaft to transfer power thereto. The core and the shaft may be configured by a rack-and-pinion gear or a worm gear so that the shaft linearly moves by the rotation of the core.

The controller may be configured to control the actuator for the rotor core to be rotated while it is disposed within a first coating portion or while it is disposed within a second coating portion in accordance to rotational speed of the motor. More specifically, the controller may be configured to control the actuator so that the rotor core is rotated while it is disposed within the first coating portion at low speeds, and the rotor core is rotated while it is disposed within the second coating portion at medium to high speeds.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
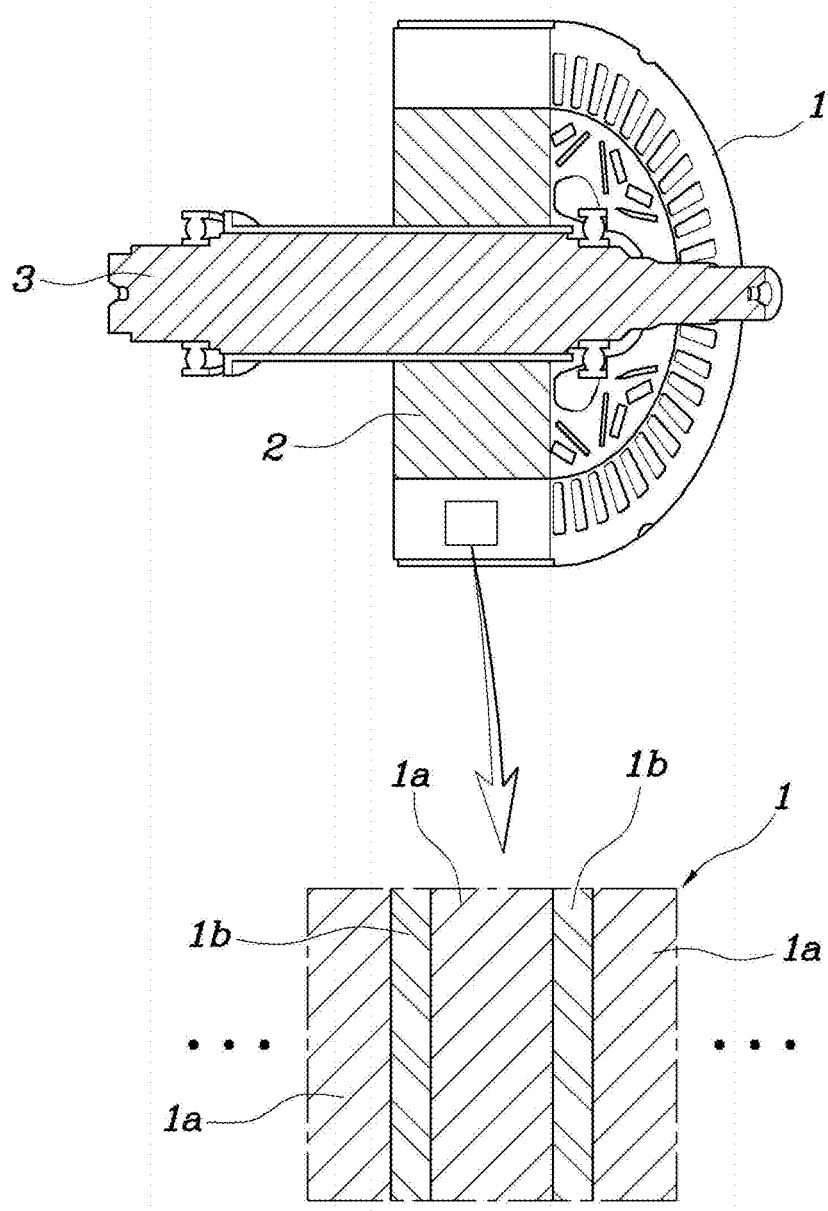
FIG. 1 is a diagram of a conventional motor used in an environment-friendly vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

A motor used for an environment-friendly vehicle according to the exemplary embodiment of the present invention includes a stator core 20 that includes a first coating portion 21 and a second coating portion 22 each of which have a different thickness of insulation coating. The coating portions 21 and 22 are configured to be adjacent to each other, wound with a coil on the outside thereof and fixedly installed in a motor case 11. The motor also includes a rotor core 30 moveably installed movably in a lengthwise direction of the stator core 20 to be positioned within the first coating portion 21 or positioned in the second coating portion 22 depending upon the speed of the motor, as well as being rotatable in the stator core 20. A shaft 40 is integrally coupled with the rotor core 30 while penetrating the rotor core 30 and an actuator 50 is connected with an end portion of the shaft 40 to provide a movable force to the shaft 40. Furthermore, a controller 60 is configured to control an operation of the actuator 50.

Herein, the stator core 20 is formed by laminating a plurality of electrical steel sheets 23 having a reduced thickness in order to reduce hysteresis loss (iron loss), and insulation coating is provided between the electrical steel sheets 23 for interlayer insulation of the electrical steel sheets 23. The stator core 20 is divided into the first coating portion 21 and a second coating portion 22 according to the thickness of the insulation coating.

That is, the first coating portion 21 includes a plurality of laminated electrical steel sheets 23 and thin-film insulation coating 24 having a thickness in a range of about 0.5 to 1.0 μm, which is coated on the electrical steel sheets 23 for interlayer insulation between the electrical steel sheets 23. Since the thin-film insulation coating 24 is very thin, the thickness of the electrical steel sheet 23 which is a pure core providing a movement passage of magnetic flux may be relatively larger and thus, the movement passage of the magnetic flux may be additionally secured. Accordingly, when the rotor core 30 is rotated with the rotor core 30 positioned within the first coating portion 21 at low speeds where the hysteresis loss (iron loss) of the motor is slight, the power loss (copper loss) of the motor may be minimized and thus, the motor efficiency at low speeds may be increased.

In addition, the second coating portion 22 may include a plurality of laminated electrical steel sheets 23 and a thin-film insulation coating 25 having a thickness in the range of about 1.0 to 3.0 μm, which is coated on the electrical steel sheets 23 to provide an interlayer insulation between the electrical steel sheets 23. The coating thickness of the medium-film insulation coating 25 is thicker than the thin film coating portion and the thickness of the electrical steel sheet 23 is relatively small as a result, which minimize the hysteresis loss (iron loss) at medium/high speeds to increase the efficiency of the motor. Accordingly, when the rotor core 30 is rotated with the rotor core 30 positioned within the second coating portion 22 at medium/high speeds where the weight of the iron loss is increased, the iron loss is minimized, thereby increasing the motor efficiency at medium and high speeds.

Meanwhile, when the thickness of the thin-film insulation coating 24 is less than 0.5 μm, the motor efficiency decreases as the irons loss is increased, and as a result, in the exemplary embodiment of the present invention, the lower limit thickness of the thin-film insulation coating 24 is preferably greater than or equal to 0.5 μm and the upper limit thickness of the thin-film insulation coating 24 is preferably less than or equal to 1.0 μm.

In addition, when the thickness of the medium-film insulation coating 25 is more than 3.0 μm, the thickness of the electrical steel sheet 23 relatively decreases, and as a result, an insulation effect is increased and since the iron loss decreases, the motor efficiency at medium and high speeds increases, but manufacturing costs are significantly increased. Therefore, in the exemplary embodiment of the present invention, the upper limit thickness of the medium-film insulation coating 25 is preferably less than or equal to 3.0 μm and the lower limit thickness of the medium-film insulation coating 25 is preferably greater than or equal to 1.0 μm. This range of values prevents manufacturing costs from being significantly increased by increasing the motor efficiency.

Further, in the stator core 20 according to the exemplary embodiment of the present invention, the second coating portion 22 is thicker than the first coating portion 21. The reason is that the first coating portion 21 is used more often than the second coating portion 22, thereby making the motor efficiency higher at medium and higher speeds.

Meanwhile, since the actuator 50 is embodied as a core 52 mounted with a coil 51 on the outer surface thereof in order to generate an electromagnetic force when current is applied, the shaft 40 may be formed by a permanent magnet to move in opposite direction to each other according to the direction of current applied to the coil 51. Therefore, when forward-direction current flows on the coil 51, as the shaft 40 moves to the left side where the actuator 50 is present, the rotor ore 30 moves to the left side of the stator core 20 to be positioned in the first coating portion 21, while when backward-direction current flows, as the shaft 40 protrudes from the actuator 50 to move to the right side, the rotor core 30 moves the right side of the stator core 20 to be positioned in the second coating portion 22.

Figure 2:
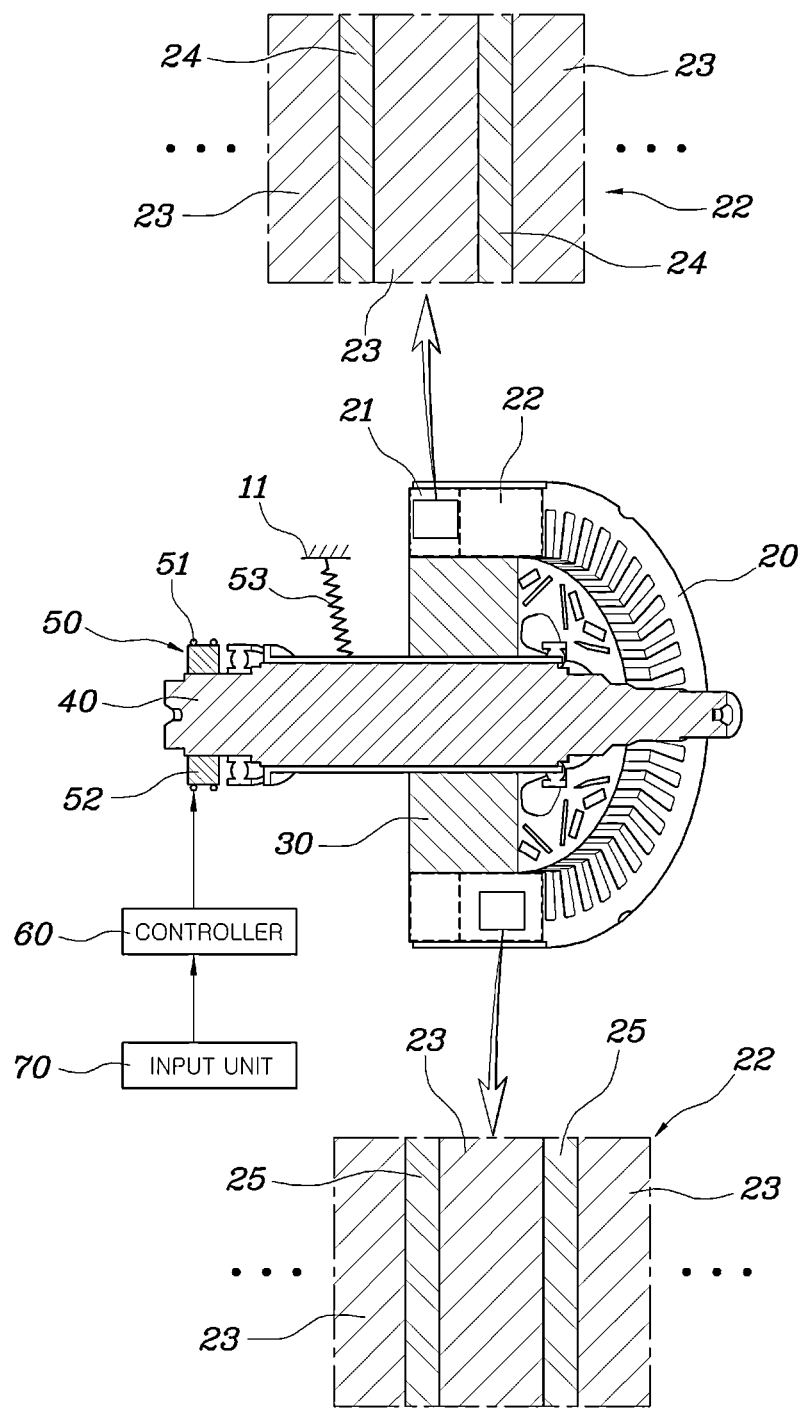
FIG. 2 is a diagram for describing a motor for an environment-friendly vehicle according to an exemplary embodiment of the present invention.
Figure 4:
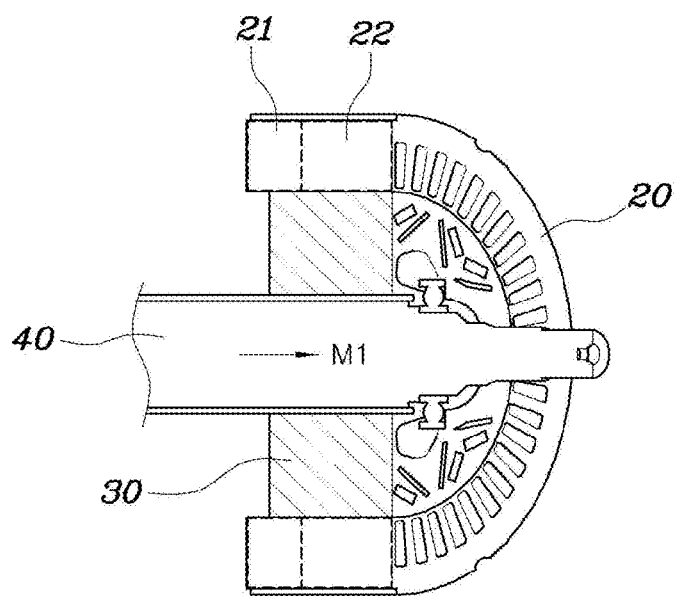
FIG. 4 is a diagram for illustrating an operational state of the motor according to the exemplary embodiment of the present invention at medium and high speeds.

As another exemplary embodiment, when the actuator 50 is configured by the core 52 mounted with the coil 51 on the outer surface thereof in order to generate the electromagnetic force when current is applied, and the shaft 40 may be made of steel that moves when current is applied to the coil 51. In particular, actuator 50 may further include a return spring that provides an elastic force in order to return the shaft 40 to its original position. In this case, one end of the return spring 53 may be coupled to the shaft 40 and the other end of the return spring 53 may be coupled to the motor case 11. Therefore, when no current is applied to the coil 51, as the shaft 40 moves to the left side where the actuator 50 is present as illustrated in FIG. 2, the rotor core 30 moves to the left side of the stator core 20 by force from the returning spring 53 to be positioned in the first coating portion 21. On the other hand, when current is applied to the coil 51, as the shaft 40 protrudes from the actuator 50 against the force of the return spring 53 to move to the right side, the rotor core 30 moves the right side of the stator core 20 to be positioned in the second coating portion 22 as illustrated in FIG. 4.

Figure 3:
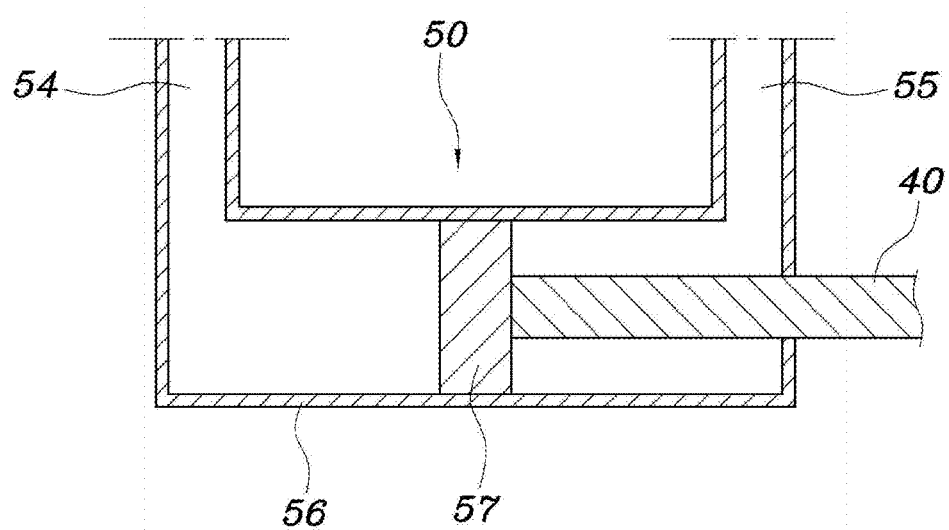
FIG. 3 is a diagram for illustrating another embodiment of an actuator in a configuration of FIG. 2.

As yet another embodiment, when the actuator 50 includes a cylinder 56 having a first port 54 and a second port 55 at both ends thereof as illustrated in FIG. 3, and a piston 57 that linearly moves in the cylinder 56 according to an oil pressure supplied to the cylinder 56, one end of the shaft 40 is installed to be connected with the piston 57. In this case, a penetration portion of the cylinder 56 by the shaft 40 is sealed to keep an airtight seal from the outside. Therefore, when oil pressure is supplied to the first port 54 by the control of the controller 60, the piston 57 moves to the right side and the shaft 40 also moves to the right side from the state illustrated in FIG. 3, and as a result, the rotor core 30 is positioned in the second coating portion 22, while when oil pressure is supplied to the second port 55, the piston 57 moves to the left side and the shaft 40 moves to the left side from the state illustrated in FIG. 3, and as a result, the rotor core 30 is positioned in the first coating portion 21.

As yet another embodiment, the actuator 50 may be the core 52 which is axially rotated by power of the motor and coupled to transfer power to the shaft 40. In this case, the core 52 and the shaft 40 may be configured as a rack-and-pinion gear or a worm gear so that the shaft 40 may linearly move due to the rotation of the core 52.

In addition, the controller 60 may be configured to receive signals associated with a rotational speed and torque of the motor from an input unit 70 to control the operation of the actuator 50. Herein, the controller 60 may be a motor controller provided in the motor therein or a remote controller installed elsewhere in the vehicle. When the rotational speed of the motor is equal to or less than 2000 rpm, the corresponding section may be identified as operating at a low speed and when the rotational speed of the motor is 2000 equal to or greater than 2000 rpm, the motor may be identified by the controller as operating at a medium/high speed.

Herein, an operation of the embodiment of the present invention will be described.

When the controller 60 determines that the motor is operating at a low speed according to an operating state of the motor, the shaft 40 moves to the left side where the actuator 50 is located as illustrated in FIG. 2 by the operation of the actuator 50, and as a result, the rotor core 30 moves to the left side of the stator core 30 to be rotated while being positioned in the first coating portion 21.

When the rotor core 30 is rotated in the first coating portion 21 of the stator core 20 while the motor is operating at a low speed where the hysteresis loss (iron loss) of the motor is minimal as described above, the movement passage of the magnetic flux may be additionally secured through the electrical steel sheet 23 having a relatively large thickness. Therefore, the power loss (copper loss) of the motor may be minimized, and as a result, the motor efficiency may be increased at low speeds as well.

In addition, when the controller 60 determines that the motor is operating at medium/high speeds according to the operating state of the motor, the shaft 40 protrudes from the actuator 50 to move to the right side by the operation of the actuator 50, and as a result, the rotor core 30 moves to the right side of the stator core 30 to be rotated within the second coating portion 22 as illustrated in FIG. 4.

When the rotor core 30 is rotated in the second coating portion 22 of the stator core 20 at medium/high speeds where the weight of the hysteresis loss (iron loss) is increased, the iron loss may be minimized, and as a result, the efficiency of the motor may be increased. That is, in the exemplary embodiment of the present invention, as the rotor core 30 may be rotated in the second coating portion 22 having large insulation coating in the medium and high speeds like a general motor, the iron loss is minimized, and as a result, the motor efficiency increases, while as the rotor core 30 may be rotated in the first coating portion 21 having thinner insulation coating at low speeds, the copper loss is minimized, and as a result, the motor efficiency increases.

Figure 5:
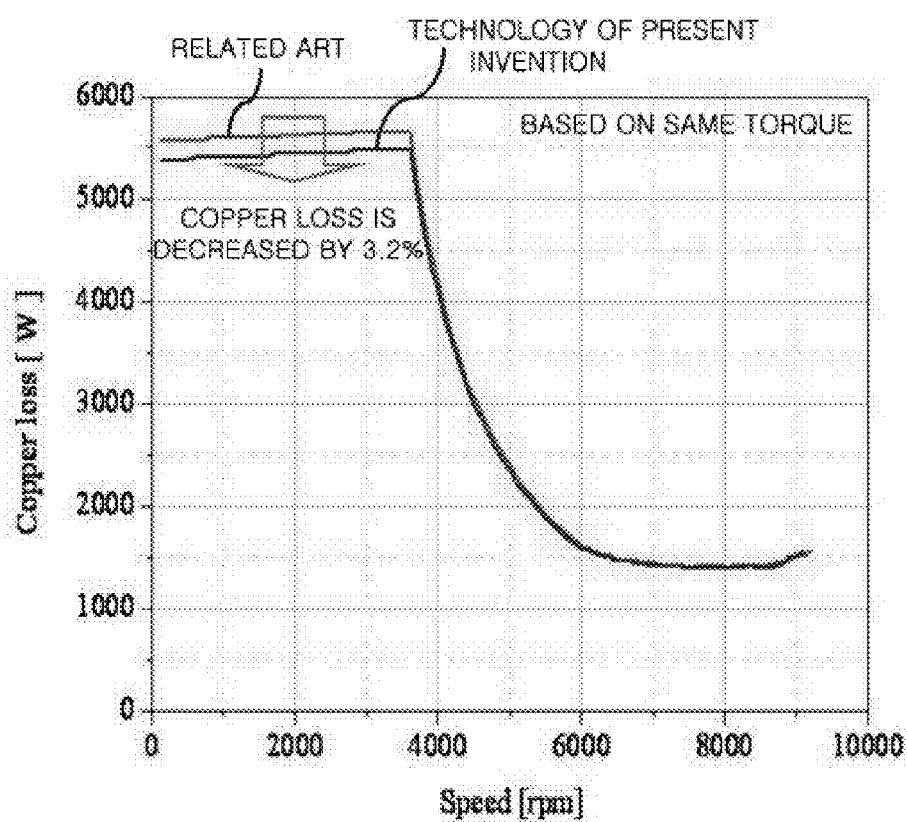
FIGS. 5 and 6 are graphs for illustrating changes in copper loss and torque of the conventional motor and the motor according to the exemplary embodiment of the present invention at low speeds.
Figure 6:
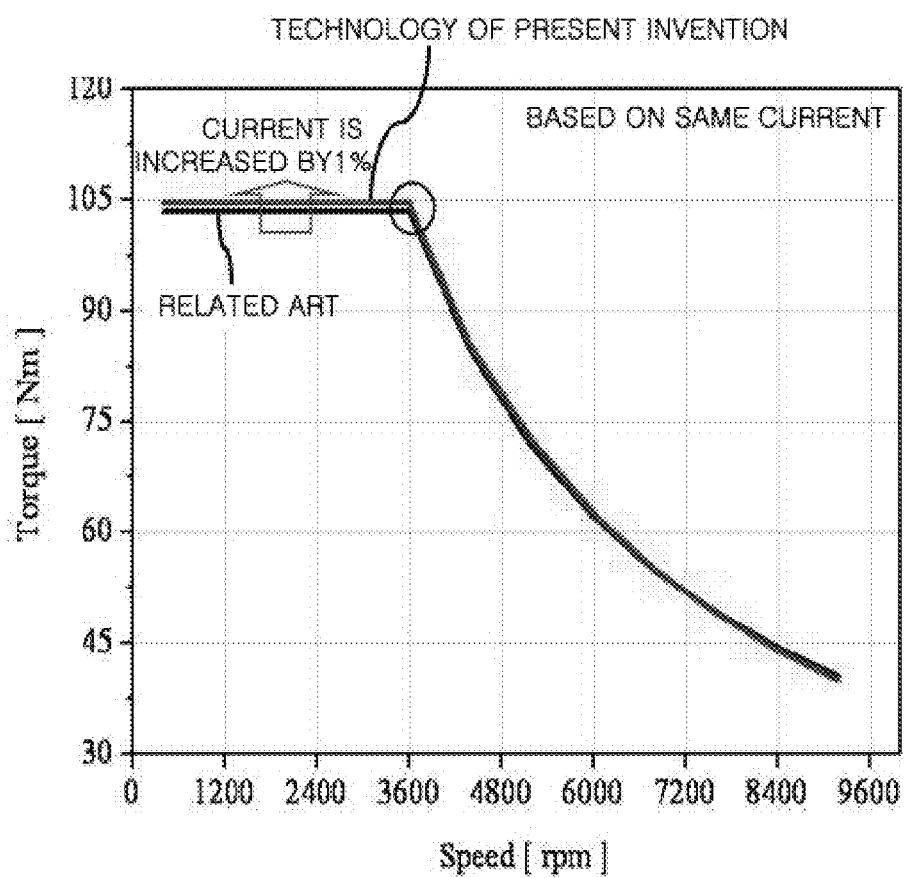

Meanwhile, FIG. 5 is a graph illustrating the reduction in the copper loss (reduction of a current amount) at low speeds based on the same torque being applied and FIG. 6 is a graph illustrating the increase in motor torque at low speeds based on the same current input. As illustrated, the copper loss is decreased in the motor according to the exemplary embodiment of the present invention that of conventional motor by approximately 3.2% and furthermore, the torque is increased in the motor according to the exemplary embodiment of the present invention by approximately 1.0% in comparison to the conventional motor. As a result, the mean efficiency of the motor is improved overall.

Advantageously, in the motor for the environment-friendly vehicle of the present invention, since a rotor core can be rotated within a thin-film coating part which is subjected to thin insulation coating at low speeds, the motor efficiency can be increased by minimizing the copper loss and since the rotor core can be rotated within a medium film coating portion at medium/high speeds, the motor efficiency can be increased by minimizing the iron loss at medium/high speeds.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A motor for an environment-friendly vehicle, comprising: a stator core including a first coating portion and a second coating portion each having a different thickness of insulation coating, respectively, wherein the first coating portion and the second coating portion are adjacent to each other, wound with a coil on an outside thereof and fixedly installed in a motor case;
a rotor core movably installed in a lengthwise direction of the stator core to be positioned within either the first coating portion or the second coating portion depending upon a speed of the motor, as well as be rotatably in the stator core;
a shaft integrally coupled with the rotor core and penetrating the rotor core;
an actuator connected to an end portion of the shaft to provide a movable force to the shaft; and
a controller configured to control an operation of the actuator,
wherein the first coating portion includes a plurality of first electrical steel sheets which are laminated with each other and a plurality of thin-film insulation coatings which are disposed between the first electrical steel sheets respectively,
wherein the second coating portion includes a plurality of second electrical steel sheets which are laminated with each other and a plurality of medium-film insulation coatings which are disposed between the second electrical steel sheets respectively, and
wherein each medium-film insulation coating is thicker than each thin-film insulation coating.

2. The motor of claim 1, wherein the second coating portion is thicker than the first coating portion.

3. The motor of claim 1, wherein the thin-film insulation coating has a thickness in a range of about 0.5 to 1.0 μm.

4. The motor of claim 1, wherein the medium-film insulation coating has a thickness in a range of about 1.0 to 3.0 μm.

5. The motor of claim 1, wherein the actuator is a core mounted with a coil on an outer surface thereof to generate an electromagnetic force when a current is applied thereto, and the shaft is formed by a permanent magnet to move in opposite directions to each other according to a direction of current applied to the coil.

6. The motor of claim 1, wherein the actuator is a core mounted with a coil on an outer surface thereof to generate an electromagnetic force when current is applied, and the shaft is made of steel that moves when current is applied to the coil.

7. The motor of claim 1, wherein the actuator includes a cylinder having a first port and a second port at both ends thereof, and a piston that linearly moves within the cylinder according to an oil pressure supplied to the cylinder, and the shaft is connected with the piston.

8. The motor of claim 1, wherein the controller is configured to control the actuator so that the rotor core is rotated while disposed within a first coating portion or disposed within a second coating portion in accordance to rotational speed of the motor.

9. The motor of claim 8, wherein the controller controls the actuator so that the rotor core is rotated while disposed within the first coating portion at low speeds, and the rotor core is rotated while disposed within the second coating portion at medium and high speeds.

* * * * *